Dec. 13, 1960  B. J. HANSEN  2,964,361
GROUSER SHOES
Filed Jan. 12, 1959  2 Sheets-Sheet 1

Dec. 13, 1960
B. J. HANSEN
2,964,361
GROUSER SHOES
Filed Jan. 12, 1959
2 Sheets-Sheet 2
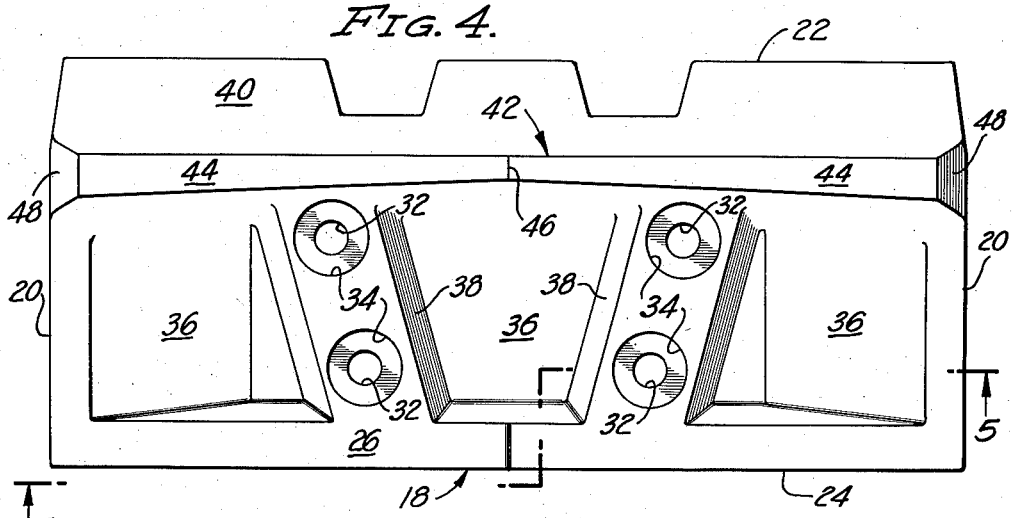
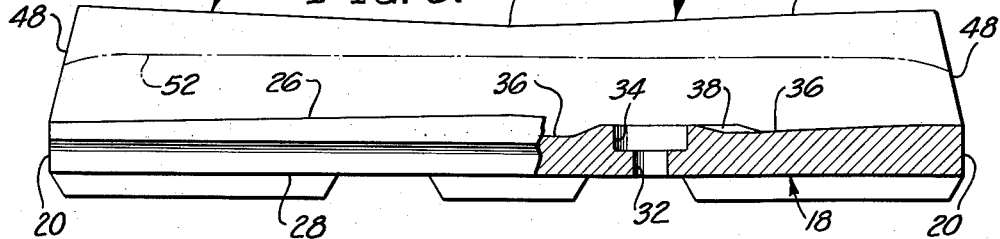
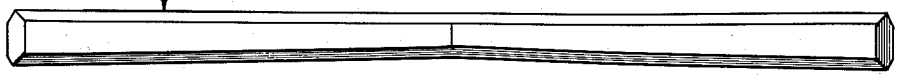
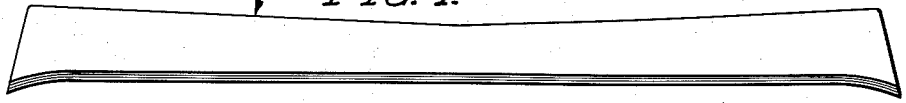
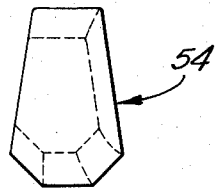

United States Patent Office 2,964,361
Patented Dec. 13, 1960

2,964,361

GROUSER SHOES

Bobby J. Hansen, Box 114, Surfside Colony, Calif.

Filed Jan. 12, 1959, Ser. No. 786,274

1 Claim. (Cl. 305—54)

This invention pertains to new and improved grouser shoes.

Virtually everyone is familiar with track or crawler type tractors. Such tractors are propelled along the ground through the use of an endless belt type of track. This track is normally supported on a series of wheels mounted on the body of the tractor itself. At least some of these wheels are normally driven by the motor within a tractor.

In such track or crawler type tractor the track is normally composed of several different parts. One of these is commonly referred to as a track rail. Such a track rail is roughly analogous to a common type of roller chain. It is engaged by the wheels projecting from the tractor itself and carries the means which actually engage the ground so as to support the tractor. These means are commonly referred to as grouser shoes.

Common grouser shoes for use in a track or crawler type tractor include a plate which is attached to several track rail assemblies by bolts and a grouser bar formed as an integral part of such a plate. This grouser bar extends from the exposed or front surface of the plate so as to engage whatever material a tractor is used upon. With this type of construction both the plate and the grouser bar normally extend a material distance on each side of the track rail assemblies used so as to be unsupported throughout a material portion of their length.

Because of the fact that common track or crawler type tractors are used in an extremely wide variety of locations under an extremely wide variety of conditions the structure of the grouser shoes used upon such tractors is exceedingly important. Prior grouser shoes have been a constant source of trouble and annoyance to many tractor operators for any one of a variety of reasons.

Frequently these prior grouser shoes do not provide the desired amount of traction on ice or snow or on various types of earth or rock formations. Also under these same conditions many of the prior grouser shoes tend to allow sidewise slippage of a tractor itself. Further many grouser shoes constructed in accordance with prior practice have been undesirable because they have tended to wear unevenly along their lengths. Also prior grouser shoes have tended to break along their unsupported lengths when used under various conditions in which forces are not equally applied to them.

A broad general object of the present invention is to provide new and improved grouser shoes for use with track or crawler type tractors. Another object of the present invention is to provide grouser shoes which are capable of digging in to virtually any type of material upon which a tractor may be used such as ice, snow, decomposed granite or other earth or rock surfaces. A further object of the present invention is to provide grouser shoes which tend to effectively prevent a tractor from slipping to one of its sides as it is used. Another object of the present invention is to provide grouser shoes which wear evenly and which are relatively immune to breakage when normally used.

These and other objects of this invention will be fully apparent to those skilled in the art to which this invention pertains from a detailed consideratiton of the remainder of this description including the appended claims and the accompanying drawings in which:

Fig. 4 is a top elevational view of this grouser shoe;

Fig. 5 is a side elevational view of this grouser shoe;

Fig. 6 is a top plan view of a regrouser bar capable of being used with a grouser shoe of this invention;

Fig. 7 is a side elevational view of this regrouser bar; and

Fig. 8 is an end elevational view of this bar.

Figure 1:
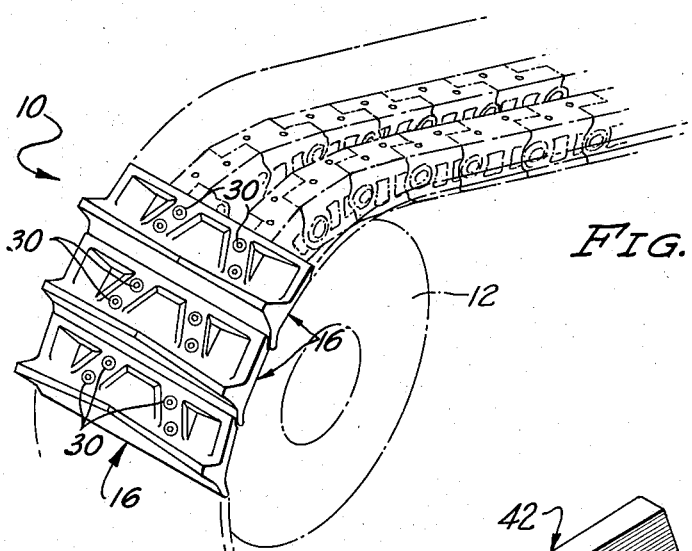
Fig. 1 is a perspective view indicating the manner in which grouser shoes of this invention are employed.
Figure 2:
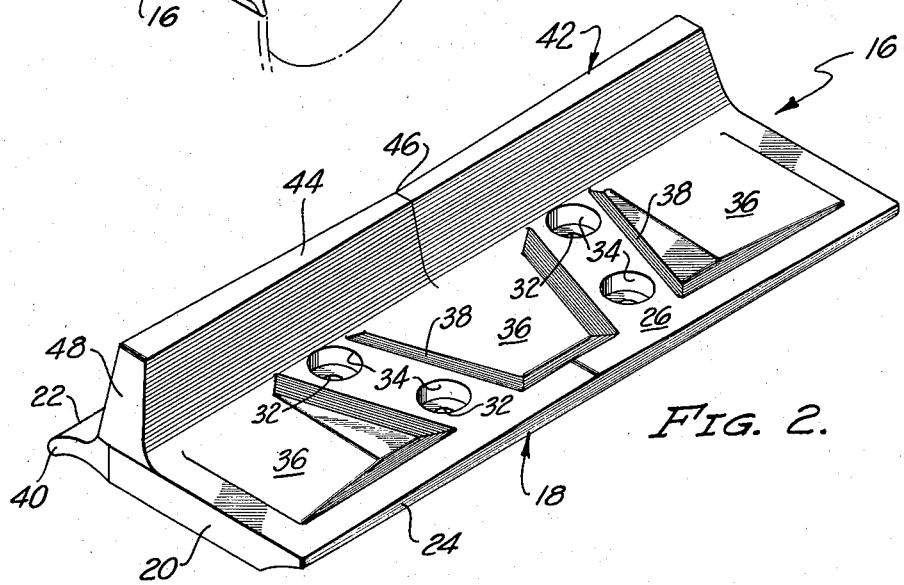
Fig. 2 is an enlarged perspective view of a single grouser shoe of this invention.
Figure 3:
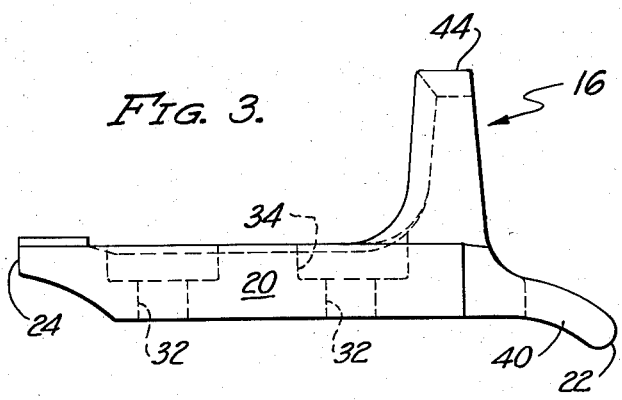
Fig. 3 is an end elevational view of this grouser shoe.

In all figures of the drawing like numerals are used to designate like parts wherever convenient for purposes of explanation and illustration. It is to be understood that the accompanying drawings are primarily intended so as to clearly illustrate a presently preferred embodiment of the invention. Those skilled in the art to which this invention pertains will realize however that changes of essentially a routine engineering nature may be made in the grouser shoes shown without changing the manner in which these shoes are used or the manner in which they operate.

As an aid to understanding this invention it can be stated in essentially summary form that it includes grouser shoes each of which is formed so as to include an elongated plate adapted to be attached to tractor rail assemblies and each of which includes as an integral part of such a plate a grouser bar extending from the front side of such a plate. With this invention the elongated plate is preferably tapered from its center toward its ends and the front side of such a plate is preferably recessed so as to lessen the weight of such a plate and so as to provide ribs which reinforce the entire plate against bending. With the grouser shoes of this invention the grouser bar is tapered with respect to the front side of the plate and is tapered away from the center portion of this bar so that its ends are larger than its center portion. The ends of this grouser bar are essentially flat, and are provided with pointed extremities capable of effectively biting into various types of surfaces.

The actual construction of this invention is best more fully seen by referring directly to the various figures of the accompanying drawings. In Fig. 1 there is shown a portion of a track 10 such as is used on a conventional track or crawler type tractor. For convenience of explanation this track is shown mounted upon a single wheel 12, although in practice it is, of course, mounted upon a plurality of wheels. The wheel 12 directly engages conventional track rail assemblies 14 which carry individual grouser shoes 16 of this invention.

As shown in Figs. 2, 3, 4, and 5 of the drawing each of these shoes 16 includes an elongated plate 18 having parallel flat ends 20, parallel side edges 22 and 24 and front and back sides 26 and 28. As indicated in Fig. 1 of this drawing the back sides 28 of the grouser shoes 16 are held against the track rail assemblies 14 through the use of bolts 30. Each of these bolts 30 passes through a hole 32 in the plate 18, and the ends of each of these bolts are fitted within recessed cavities 34 in the front side 26 of the plate 18 so as to be effectively protected from any possible damage during use.

The front side 26 of the plate 18 in the grouser shoe 16 illustrated in Figs. 2, 3, 4, and 5 of the drawings is provided with three recessed portions 36 which are separated from one another by ribs 38. These ribs effectively reinforce the plate 18. As indicated in the various figures of the drawings they contain the holes 32. Thus, the bolts 30 engage the plate 18 in reinforced areas of the plate 18 so as to minimize the tendency of this plate to break adjacent to these holes 32.

The plate 18 shown is formed so that the portion 40 of it adjacent to the side edge 22 is curved uniformly along its length toward the back side 28 of the plate 18. The other edge 24 of the plate 18 is also curved along its length, but is curved away from the back side 28 of the plate 18 so that a plurality of these shoes may be used in the manner indicated in Fig. 1 of the drawing with the side edge 22 on one of these shoes 16 fitting under the side edge 24 on the next adjacent of these shoes 16. In a grouser shoe 16 of this invention a grouser bar 42 is formed integrally with the plate 18 so as to have an edge surface 44 located away from the plate 18. This bar 42 is tapered so that the edge 44 is less thick, or thinner, at any point than the portion of the bar 42 attached to the plate 18, directly beneath such a point. This feature provides for additional structural rigidity of the complete bar 42 and aids in preventing the bar 42 from bending during use. Preferably the bar 42 is also tapered away from its center 46 toward its ends 48 in both a direction extending along the plate 18 and in a direction extending away from the plate 18. Thus, the ends 48 of the bar 42 are farther from the plate 18 than the center 46 of the bar, and are thicker than the center 46 of the plate 18. Preferably these ends 48 are flat and are tapered slightly toward one another so that the planes of these ends meet at a point remote from the front side 26.

This type of construction of the grouser bar 42 is very advantageous for a number of reasons. The tapered shape of the grouser bar 42 serves to effectively prevent this grouser bar from bending during use of a grouser shoe 16. Further, the fact that the bar 42 has an essentially flat shape terminating in a comparatively sharp edge 44 is very effective in enabling this grouser bar 42 to bite into varying types of surfaces during use. The fact that the grouser bar 42 is tapered toward its ends 48 is further very advantageous inasmuch as this results in the grouser bar 42 having a great deal of lateral or side area provided by the ends 48 which is available so as to prevent sidewise slippage of a tractor. The flat configuration of the ends 48 is particularly effective in this regard inasmuch as it provides a substantial amount of area at right angles to the direction of normal tractor travel. The comparative distinct and sharp junctures between the edge 44 and the ends 48 act as points which "bite" into various types of surfaces so as to also provide a very effective holding action.

With the grouser shoe 16 the plate 18 is gradually tapered from the center portion of this plate 18 adjacent to the ribs 38 toward the ends 20 of the plate 18 so that these ends 20 are thinner than the center portion of the plate 18, except, of course, where the recessed portions 36 are present. This structure provides comparatively large surface areas in these ends 20 at right angles to the direction of normal tractor travel available to combat such slippage. The flat configuration of these ends 20 is also important in this regard. The precise shape of the plate 18 is important for a number of other reasons. This plate is formed in such a manner that the portions of it adjacent to the ends 20 which are normally unsupported during the use of the shoes 16 are effectively reinforced against bending because of the amount of metal available in these portions and because of the disposition of this metal relative to the remainder of the plate 18.

Normally it is preferred to manufacture grouser shoes 16 of this invention out of an appropriate steel composition which is capable of "work hardening" as these shoes are used upon a tractor so as to increase their effective strength. Thus, the grouser shoes 16 are preferably manufactured out of manganese steel or the like using known manufacturing techniques. When such materials are used in manufacturing the shoes 16, all of the parts of these shoes, and in particular the grouser bars 42 attached to them, and the portions of the plate 18 adjacent to the ends 20 become tougher during use.

Because of the shape of the grouser bar 42 employed with a grouser shoe 16 of this invention such a bar will tend to wear down fairly evenly along its length during use. Such wear normally occurs substantially as indicated in the dotted line 52 shown in Fig. 5 of the drawing. After a grouser shoe 16 has been worn down in this manner a regrouser bar 54 as shown in Figs. 6, 7, and 8 of the drawings may be conveniently attached to it by welding so as to extend the effective life of this shoe for a prolonged period. Preferably, the configuration of the regrouser bar 54 is the same as the configuration of the portion of the bar 42 which is removed by wear. Since the shape of this grouser bar 42 is disclosed in detail in this specification, the shape of the regrouser bar 54 is not specifically defined in this description of it. When structural considerations permit the regrousering bar 54 may be used on worn grouser shoes of conventional design so as to achieve many of the advantages of this invention.

Those skilled in the art to which this invention pertains will realize that grouser shoes as herein described are extremely effective for use on many types of surfaces. When these shoes are used on relatively hard surfaces in which the grouser bars 42 do not penetrate to any material extent relatively little friction is developed. The grouser shoes of this invention are advantageous inasmuch as when they are used on a tractor they affect the steering of a tractor less than many prior grouser shoes. They will further realize that these shoes are comparatively light in weight and that they may be easily and conveniently manufactured in accordance with routine manufacturing processes. Because of the nature of this invention it is to be considered as being limited only by the appended claim forming a part of this disclosure.

I claim:

A grouser shoe which comprises: an elongated plate extending in a generally flat plane, said plate having front and back sides and having parallel flat ends and parallel side edges, said plate tapering from the center portion thereof toward said ends, so that the center portion of said plate is thicker than the ends thereof, the portion of said plate adjacent to one of side edges of said plate being curved away from said plane in the direction of the back side of said plate, the other of said side edges of said plate being of a curved configuration extending away from the back side of said plate, the center portion of said plate being formed so as to include recessed portions separated by reinforcing ribs, said ribs and said recessed portions being located on the front side of said plate, said plate also being formed so as to include holes extending through said ribs and recessed cavities in said ribs at the front side of said plate extending around said holes, said plate also including a grouser bar formed integrally therewith and extending from said front side of said plate between said recessed portions and said ribs and said one of said side edges of said plate, said grouser bar being parallel to said side edges of said plate and being tapered so as to be larger in dimension at said front side of said plate than at its edge remote from said plate, said grouser bar also being tapered from the center thereof toward said ends of said plate so as to be of larger dimension at its ends than at the center, the edge of said grouser bar remote from said plate also being tapered with respect to said plate so that the ends of said grouser bar adjacent to ends of said plate extend from the said plate further than from the center of said grouser bar, said ends of said grouser bar being flat and tapered toward one another.

References Cited in the file of this patent

UNITED STATES PATENTS

| | | |
|---|---|---|
| 1,063,493 | Allen | June 3, 1913 |
| 1,494,568 | Allen | May 20, 1924 |
| 2,823,082 | Bauer | Feb. 11, 1958 |
| 2,849,259 | Engstrom | Aug. 26, 1958 |
| 2,874,005 | Engstrom | Feb. 17, 1959 |